United States Patent
Yoo et al.

(10) Patent No.: US 10,437,246 B2
(45) Date of Patent: *Oct. 8, 2019

(54) COMMUNICATION APPARATUS AND METHOD FOR UNMANNED AERIAL VEHICLE

(71) Applicant: Korea Aerospace Research Institute, Daejeon (KR)

(72) Inventors: Chang Sun Yoo, Daejeon (KR); Joong Wook Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/767,155

(22) PCT Filed: Oct. 12, 2016

(86) PCT No.: PCT/KR2016/011404
§ 371 (c)(1),
(2) Date: Apr. 10, 2018

(87) PCT Pub. No.: WO2017/065486
PCT Pub. Date: Apr. 20, 2017

(65) Prior Publication Data
US 2018/0299881 A1 Oct. 18, 2018

(30) Foreign Application Priority Data
Oct. 13, 2015 (KR) .................. 10-2015-0142835

(51) Int. Cl.
*G05D 1/00* (2006.01)
*H04B 7/185* (2006.01)
(Continued)

(52) U.S. Cl.
CPC ......... *G05D 1/0022* (2013.01); *B64C 39/024* (2013.01); *G05D 1/101* (2013.01);
(Continued)

(58) Field of Classification Search
None
See application file for complete search history.

(56) References Cited

U.S. PATENT DOCUMENTS 7,408,898 B1    8/2008  Brown
9,220,086 B2 *  12/2015 Wang ................. H04B 7/18506
(Continued)

FOREIGN PATENT DOCUMENTS

KR    10-2011-0088053    8/2011
KR    10-2012-0006160    1/2012
(Continued)

OTHER PUBLICATIONS

Jennifer L. Richter, "Comments of the Small UAV Coalition", Aug. 31, 2015, p. 8, Paragraph A. (Year: 2015) (Year: 2015).*
(Continued)

*Primary Examiner* — Dale W Hilgendorf
*Assistant Examiner* — Alexander Connor Larkin Bost

(57) ABSTRACT

A communication system for an unmanned aerial vehicle according to one embodiment of the present invention comprises: an onboard communication apparatus mounted on an unmanned aerial vehicle, for communicating by means of a previously configured first band and a previously configured second frequency band; and a ground communication apparatus for communicating with the onboard communication apparatus by means of the previously configured first band and previously configured second frequency band.

12 Claims, 3 Drawing Sheets

(51) Int. Cl.
*H04B 7/208* (2006.01)
*B64C 39/02* (2006.01)
*G05D 1/10* (2006.01)
*G07C 5/00* (2006.01)

(52) U.S. Cl.
CPC ............ *G07C 5/008* (2013.01); *H04B 7/185* (2013.01); *H04B 7/18504* (2013.01); *H04B 7/18506* (2013.01); *H04B 7/18508* (2013.01); *H04B 7/208* (2013.01); *B64C 2201/146* (2013.01)

(56) References Cited

U.S. PATENT DOCUMENTS

| | | |
|---|---|---|
| 9,716,309 B1 * | 7/2017 | ElSallal ................... H01Q 5/00 |
| 10,059,459 B2 * | 8/2018 | Clark ................... B64C 39/024 |
| 2007/0243505 A1 | 10/2007 | Rath et al. |
| 2010/0087980 A1 | 4/2010 | Spura |
| 2015/0147976 A1 | 5/2015 | Wang et al. |
| 2015/0230207 A1 | 8/2015 | Wang et al. |

FOREIGN PATENT DOCUMENTS

| | | |
|---|---|---|
| KR | 10-2015-0021293 | 3/2015 |
| WO | WO 2015/001351 | 1/2015 |
| WO | WO 2017/065486 | 4/2017 |

OTHER PUBLICATIONS

International Search Report and the Written Opinion dated Jan. 16, 2017 From the Korean Intellectual Property Office Re. Application No. PCT/KR2016/011404 and Its Translation of Search Report Into English. (13 Pages).

Supplementary European Search Report and the European Search Opinion dated May 8, 2019 From the European Patent Office Re. Application No. 16855703.1. (13 Pages).

Martinez Paredes et al. "Challenges in Designing Communication Systems for Unmanned Aerial Systems Integration Into Non-Segregated Airspace", 2014 IEEE Military Communications Conference, MILCOM 2014, Baltimore, MD, USA, Oct. 6-8, 2014, XP032686529, p. 1435-1439, Oct. 6, 2014.

* cited by examiner

COMMUNICATION APPARATUS AND METHOD FOR UNMANNED AERIAL VEHICLE

RELATED APPLICATIONS

This application is a National Phase of PCT Patent Application No. PCT/KR2016/011404 having International filing date of Oct. 12, 2016, which claims the benefit of priority of Korean Patent Application No. 10-2015-0142835 filed on Oct. 13, 2015. The contents of the above applications are all incorporated by reference as if fully set forth herein in their entirety.

FIELD AND BACKGROUND OF THE INVENTION

The present invention relates to a communication apparatus and method, and more particularly, to a communication apparatus and method for an unmanned aerial vehicle.

An unmanned aerial vehicle (UAV) is an aircraft that does not carry a pilot abroad, can be remotely controlled from the ground, fly according to a pre-programmed program or autonomously fly by recognizing and determining a surrounding environment by itself.

Although UAVs are mostly used in the area of military, civilian UAVs are increasingly being used. Accordingly, safety issues of UAVs are on the rise.

In order to maintain safety of an unmanned aircraft system, a communication link between an aircraft (i.e., an UAV) and a ground control system (GCS) needs to be stably maintained. A communication apparatus is more important in unmanned aircraft systems than in manned aircraft systems. Also, since an UAV does not have a pilot aboard, it is dependent upon a communication system more than a manned aerial vehicle in controlling an aerial vehicle, and has a need for a more independent and secure communication.

SUMMARY OF THE INVENTION

The present invention is directed to providing a communication apparatus and method for ensuring safe operation of an unmanned aerial vehicle.

One aspect of the present invention provides a communication system for an unmanned aerial vehicle (UAV), the communication system including: an onboard communication apparatus mounted on an UAV and configured to operate in a preset first frequency band and a preset second frequency band; and a ground communication apparatus configured to communicate with the onboard communication apparatus using the preset first frequency band and the preset second frequency band.

The preset first frequency band may be a C-band, and the preset second frequency band may be an ultra-high frequency (UHF) band.

The preset first frequency band may be a band of 5,030 MHz to 5,091 MHz.

At least one of a telecommand (TC) and telemetry (TM) may be transmitted and received between the onboard communication apparatus and the ground communication apparatus.

The ground communication apparatus may communicate with a ground control apparatus through Ethernet, and the onboard communication apparatus communicates with a flight control computer mounted on the UAV through RS-232.

The ground communication apparatus may include a ground main communicator using the first frequency band and a ground subsidiary communicator using the second frequency band, and the onboard communication apparatus may include an onboard main communicator using the first frequency band and an onboard subsidiary communicator using the second frequency band.

The ground main communicator may include a baseband unit connected to the ground control apparatus, a transmission unit connected to the baseband unit, a reception unit connected to the baseband unit, a duplexer connected to the transmission unit and the reception unit, and an antenna unit connected to the duplexer; the ground subsidiary communicator may include a transceiver unit connected to the ground control apparatus, a radio frequency (RF) switch unit connected to the transceiver unit, and an antenna unit connected to the RF switch unit; the onboard main communicator may include a baseband unit connected to the flight control computer, a transmission unit connected to the baseband unit, a reception unit connected to the baseband unit, a duplexer connected to the transmission unit and the reception unit, and an antenna unit connected to the duplexer; and the onboard subsidiary communicator may include a transceiver unit connected to the flight control computer, a RF switch unit connected to the transceiver unit, and an antenna unit connected to the RF switch.

At least one of the onboard main communicator and the onboard subsidiary communicator may further include a divider interposed between and connected to the duplexer and the antenna unit, and the antenna unit may include a first antenna unit and a second antenna unit mounted on different positions.

Another aspect of the present invention provides a communication method applied in a communication system for an UAV, the communication method including: receiving, by an onboard communication apparatus mounted on an UAV, a signal for controlling an UAV using a preset first frequency band and a preset second frequency band from a ground communication apparatus; and processing, by the onboard communication apparatus, the signal.

Another aspect of the present invention provides a communication method applied in a communication system for an UAV, the communication method including: generating, by a ground communication apparatus, a signal for controlling an UAV; and transmitting, by the ground communication apparatus, the signal to an onboard communication apparatus mounted on the UAV using a preset first frequency band and a preset second frequency band.

According to an embodiment of the present invention, a communication link between an unmanned aerial vehicle (UAV) and a ground control system (GCS) can be stably maintained, thus enabling safe operation of the UAV.

According to an embodiment of the present invention, communication equipment for forming a communication link between an UAV and a GCS is provided in a double structure so that stable communication can be enabled without communication loss even in an emergency.

DESCRIPTION OF SPECIFIC EMBODIMENTS OF THE INVENTION

Figure 1:
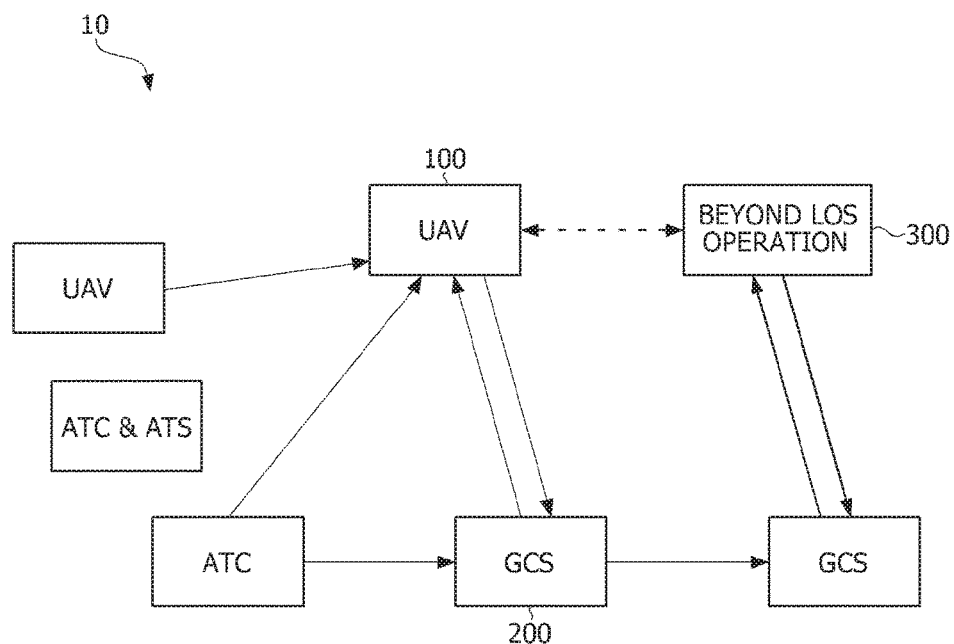
FIG. 1 is a view illustrating an unmanned aircraft system according to one embodiment of the present invention.

While the present invention is susceptible to various modifications and alternative embodiments, specific embodiments thereof are exemplarily shown in the drawings and will be described. However, it should be understood that there is no intention to limit the present invention to the particular embodiments disclosed, and, on the contrary, the present invention is to cover all modifications, equivalents, and alternatives falling within the spirit and scope of the present invention.

Although the terms including ordinal numbers, such as "first," "second," and the like may be used to describe various components, the terms do not limit the corresponding components and are used only for the purpose of distinguishing one component from another component. For example, without departing from the range of the scope of the present invention, a first component may be referred to as a second component, and similarly a second component may be referred to as a first component. The term "and/or" refers to a combination of a plurality of described related items or any one of the plurality of described related items.

It should be understood that when an element is referred to as being "connected" or "coupled" to another element, the element may be directly or indirectly connected or coupled to the other element, or intervening elements may be present. Conversely, when an element is referred to as being "directly connected to" or "directly coupled to" another element, there are no intervening elements present.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It should be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings. The same reference numerals will be used to designate the same elements, and details of redundant descriptions will be omitted throughout the entire specification.

FIG. 1 is a view illustrating an unmanned aircraft system according to one embodiment of the present invention.

Referring to FIG. 1, an unmanned aircraft system 10 includes an unmanned aerial vehicle (UAV) 100 and a ground control system (GCS) 200.

The UAV 100 and the GCS 200 communicate with each other in a wireless manner. In this case, communication between the UAV 100 and the GCS 200 may be divided into a line of sight (LOS) operation and a beyond LOS operation. The LOS operation is a communication method employed when the UAV 100 and the GCS 200 are directly connected to each other, and the beyond LOS operation is a communication method in which the UAV 100 and the GCS 200 are connected using a satellite 300 and the like when an obstacle exists therebetween.

At least one of telecommands (TCs) and telemetry (TM) may be transmitted and received between the UAV 100 and the GCS 200. Here, the TC represents a transmission signal for controlling a remote system, and the TM represents a technology for measuring information at remote points using radio waves or an IP network.

Meanwhile, a communication between the UAV 100 and the GCS 200 may be divided into an uplink communication and a downlink communication. A command and a control signal for taking off or lifting the UAV 100 or moving the UAV 100 to a flight region to perform a task may be transmitted from the GCS 200 to the UAV 100 through the uplink communication. Various pieces of sensor data, such as a location and posture of the UAV 100, may be transmitted from the UAV 100 to the GCS 200 through the downlink communication.

As such, in order for the UAV 100 and the GCS 200 to communicate with each other, a predetermined frequency band needs to be used. According to the embodiment of the present invention, the UAV 100 and the GCS 200 communicate with each other in a preset first frequency band or a preset second frequency band. Accordingly, frequency bands for communication between civilian UAVs of which demand is rapidly increasing and the GCS may be predetermined, and frequency collision may be avoided such that secure communication may be achieved.

Figure 2:
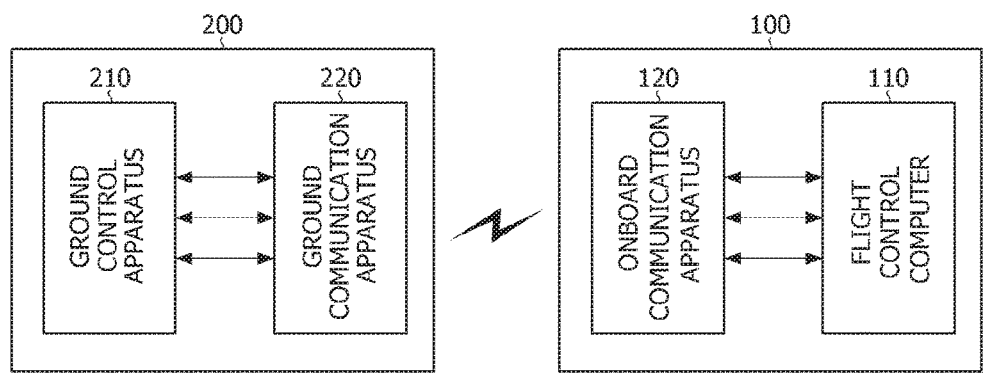
FIG. 2 is a block diagram illustrating an unmanned aerial vehicle (UAV) and a ground control system (GCS) according to one embodiment of the present invention.

FIG. 2 is a block diagram illustrating an UAV and a GCS according to one embodiment of the present invention.

Referring to FIG. 2, an UAV 100 includes a flight control computer (FCC) 110 and an onboard communication apparatus 120. Although not shown in FIG. 2, the UAV 100 may further include an electronic control unit (ECU) that operates task equipment according to a command from the FCC 110 and a camera.

The FCC 110 receives an uplink signal provided from the GCS 200 through the onboard communication apparatus 120, and accordingly, controls flight of the UAV 100 and performs a preset task.

Here, the uplink signal may be command information that is required for operation of the UAV 100. The command information, for example, may include command information related to flight control and navigation and command information related to operation of task equipment. Here, the flight control and navigation command may include commands for controlling a posture control mode, an altitude/speed/heading hold mode, and an autopilot mode. The autopilot mode may include a way point navigation mode, a pre-programmed mode, an auto take-off/landing and hovering mode, a recovery mode, a collision avoidance mode, a camera guide mode, and an emergency mode. The command information related to the operation of task equipment may include manipulation commands of a camera mounted on the task equipment, such as a rotation command, a reduction and enlargement command, an optical/thermal imaging shift command, and the like.

In addition, the FCC 110 may transmit a downlink signal to the GCS 200 through the onboard communication apparatus 120. The downlink signal may include aircraft state information collected from the camera, the task equipment, various sensors, and the like mounted on the UAV 100. The aircraft state information, for example, may include aircraft posture and navigation information, analog sensor information, and results of checking various units of the onboard equipment. Here, the navigation information may include information related to a speed, an altitude, a heading, a position, and the like, and the analog sensor information may include information related to a temperature, a pressure, a vibration, and the like.

The onboard communication apparatus 120 receives an uplink signal transmitted from the GCS 200 and delivers the received uplink signal to the FCC 110. The onboard communication apparatus 120 collects and generates a downlink signal and transmits the downlink signal to the GCS 200.

To this end, the onboard communication apparatus 120 may communicate with the FCC 110 using three types of interfaces. For example, the onboard communication apparatus 120 may transmit and receive TC data and TM data through a data interface, receive an image captured by the camera through an image signal interface in an analog scheme, and transmit and receive a voice signal through a voice signal interface.

The GCS 200 includes a ground control apparatus 210 and a ground communication apparatus 220.

The ground control apparatus 210 receives a downlink signal through communication between the onboard communication apparatus 120 and the ground communication apparatus 220. The downlink signal may include the aircraft state information collected by the UAV 100, and the aircraft state information may include the aircraft posture and navigation information, the analog sensor information, and the results of checking various units of the onboard equipment.

The ground control apparatus 210 transmits an uplink signal to the UAV 100 through the ground communication apparatus 220. Here, the uplink signal may include the flight control data and task equipment control data.

The ground communication apparatus 220 collects and generates an uplink signal to be transmitted to the UAV 100 and transmits the collected and generated uplink signal to the UAV 100. The ground communication apparatus 220 receives a downlink signal transmitted from the UAV 100 and delivers the received downlink signal to the ground control apparatus 210.

To this end, the ground communication apparatus 220 may communicate with the ground control apparatus 210 using three types of interfaces. For example, the ground communication apparatus 220 may transmit and receive TC data and TM data through a data interface, receive an image captured by the camera through an image signal interface in an analog scheme, and transmit and receive a voice signal through a voice signal interface.

In this specification, the onboard communication apparatus 120 and the ground communication apparatus 220 may be collectively referred to as a communication system for an UAV.

According to one embodiment of the present invention, the onboard communication apparatus 120 and the ground communication apparatus 220 may communicate with each other in a preset first frequency band, that is, a C-band, and a preset second frequency band, that is, an ultra-high frequency (UHF) band. In more detail, the first frequency band may be a band of 5,100 MHz to 5,150 MHz. In this case, 5,030 MHz to 5,091 MHz are non-payload frequencies. In addition, the second frequency band may be a 450 MHz band. As such, when the UAV is controlled in the band of 5,030 MHz to 5,091 MHz, secure communication between the onboard communication apparatus 120 and the ground communication apparatus 220 is ensured. In this case, the onboard communication apparatus 120 and the ground communication apparatus 220 may emit radio waves with a power of −75 dBW/MHz at an outside of the band of 5,030 MHz to 5,091 MHz. Accordingly, collision with a radio navigation satellite using a frequency band adjacent to the frequency band used by the onboard communication apparatus 120 and the ground communication apparatus 220 may be prevented. In addition, when the UAV is controlled simultaneously using the C-band and the UHF band, the UAV is safely controlled without communication loss even in an emergency.

Figure 3:
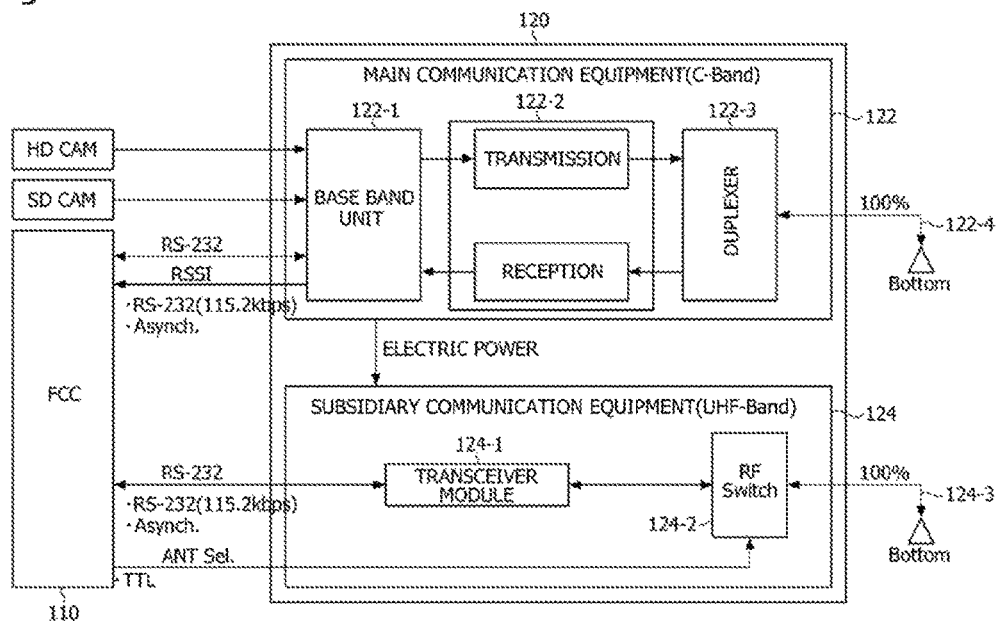
FIG. 3 is a block diagram illustrating an onboard communication apparatus mounted in the UAV according to one embodiment of the present invention.
Figure 4:
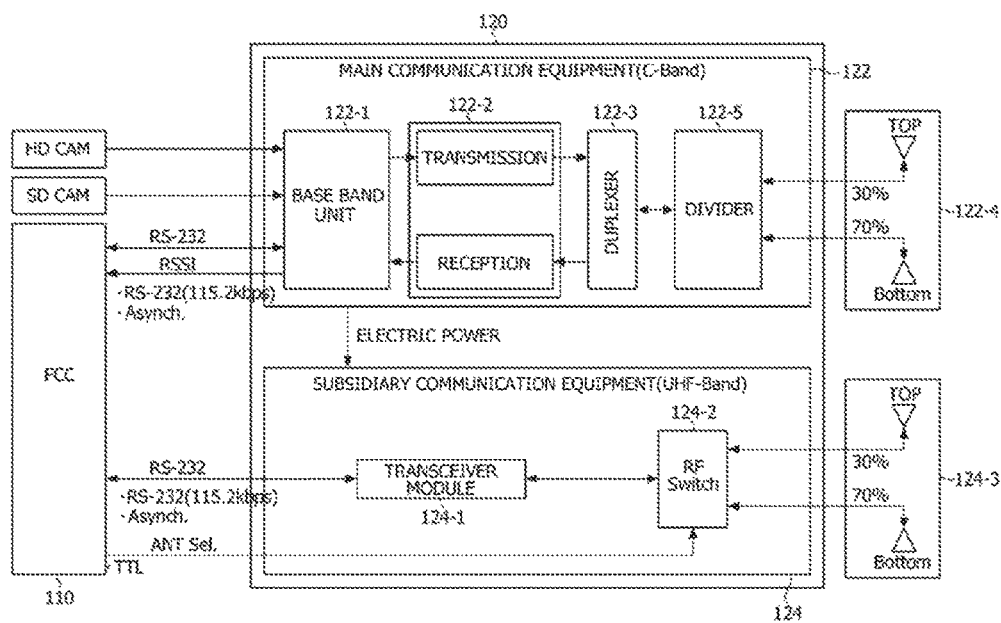
FIG. 4 is a block diagram illustrating an onboard communication apparatus mounted in the UAV according to another embodiment of the present invention.
Figure 5:
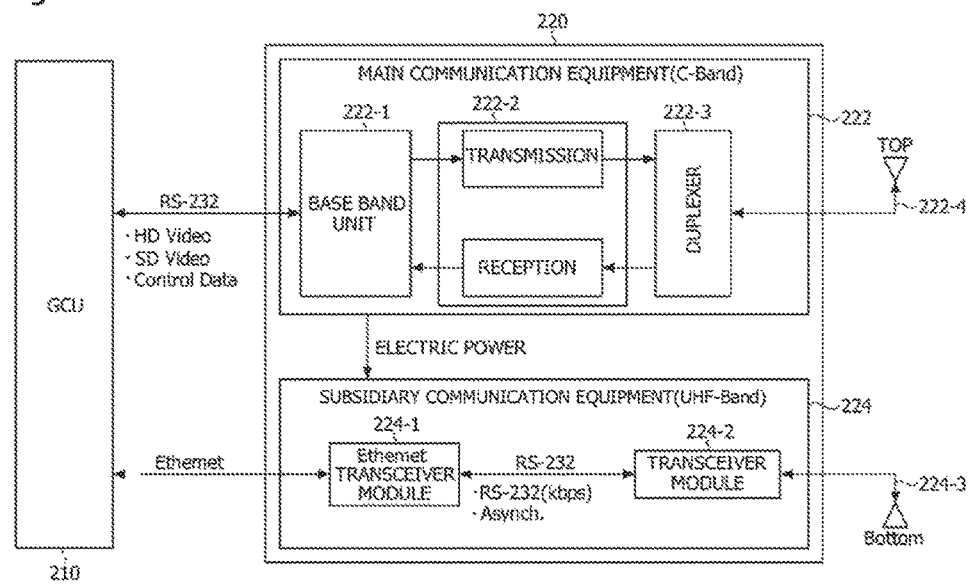
FIG. 5 is a block diagram illustrating a ground communication apparatus included in the GCS according to one embodiment of the present invention.

FIG. 3 is a block diagram illustrating an onboard communication apparatus mounted in the UAV according to one embodiment of the present invention, FIG. 4 is a block diagram illustrating an onboard communication apparatus mounted in the UAV according to another embodiment of the present invention, and FIG. 5 is a block diagram illustrating a ground communication apparatus included in the GCS according to one embodiment of the present invention.

Referring to FIG. 3, the onboard communication apparatus 120 may communicate with the FCC 110 using a RS-232 serial communication interface. The onboard communication apparatus 120 may include an onboard main communicator 122 using the first frequency band and an onboard subsidiary communicator 124 using the second frequency band. The onboard main communicator 122 may include a baseband unit 122-1 connected to the FCC 110 and configured to receive data from a high definition (HD) camera (CAM) and a standard definition (SD) CAM, a transceiver unit 122-2 connected to the baseband unit 122-1, a duplexer 122-3 connected to the transceiver unit 122-2, and an antenna unit 122-4 connected to the duplexer 122-3. The transceiver unit 122-2 may include a transmission unit and a reception unit.

The onboard subsidiary communicator 124 may include a transceiver unit 124-1 connected to the FCC 110, a radio frequency (RF) switch unit 124-2 connected to the transceiver unit 124-1, and an antenna unit 124-3 connected to the RF switch 124-2.

Referring to FIG. 4, the onboard main communicator 122 may further include a divider 122-5 between the duplexer 122-3 and the antenna unit 122-4. Each of the antenna units 122-4 and 124-3 of the onboard main and subsidiary communicators 122 and 124 may include a first antenna unit and a second antenna unit. The first antenna unit may be mounted on the bottom of the UAV, and the second antenna unit may be mounted on the top of the UAV. The first antenna unit mounted on the bottom of the UAV is normally operated. However, a case in which an LOS of the antenna is not obtained exists depending on the state of the UAV. In this case, the second antenna units mounted on the top of the UAV is operated so that communication loss may be prevented. To this end, the divider 122-5 divides frequencies or times and transmits the divided frequencies or times through the first antenna unit and the second antenna unit. In particular an alignment between antennas is important in the C-band which is a high frequency band. As first antenna unit and the second antenna unit are mounted on different positions according to the embodiment of the present invention, alignment with an antenna unit of the ground communication apparatus 220 is facilitated, and thus, a transmission speed may be improved and a transmission amount may be increased.

Although each of the onboard main communicator and the onboard subsidiary communicator is illustrated as including two antenna units, that is, the first antenna unit and the second antenna unit, as an example in this specification, the present invention is not limited thereto. For example, each of the onboard main communicator and the onboard subsidiary communicator may have a plurality of antenna units mounted thereon.

Referring to FIG. 5, the ground communication apparatus 220 may communicate with the ground control apparatus 210 through Ethernet. The ground communication apparatus 220 may include a ground main communicator 222 using the first frequency band and a ground subsidiary communicator 224 using the second frequency band. The ground main communicator 222 may include a baseband unit 222-1 connected to the ground control apparatus 210, a transceiver unit 222-2 connected to the baseband unit 222-1, a duplexer 222-3 connected to the transceiver unit 222-2, and an antenna unit 222-4 connected to the duplexer 222-3. The ground subsidiary communicator 224 may include an Ethernet converter 224-1 connected to the ground control apparatus 210, a transceiver module 224-2 communicating with the Ethernet converter 224-1 through RS-232, and an antenna unit 224-3 connected to the transceiver module 224-2. In this case, the antenna unit 222-4 of the ground main communicator 222 may be a directional antenna that is directed toward the UAV. The antenna unit 224-3 of the ground subsidiary communicator 224 may be a directional antenna or an omni-directional antenna.

Referring to FIGS. 3 to 5, the onboard communication apparatus 120 and the ground communication apparatus 220 simultaneously use two frequency bands, that is, the C-band and the UHF band. For example, the onboard main communicator 122 of the onboard communication apparatus 120 and the ground main communicator 222 of the ground communication apparatus 220 use the C-band, that is, the band of 5,030 MHz to 5,091 MHz, and the onboard subsidiary communicator 124 of the onboard communication apparatus 120 and the ground subsidiary communicator 224 of the ground communication apparatus 220 use the UHF band. As such, when the ground communication apparatus 220 uses the frequencies of 5,030 MHz to 5,091 MHz as non-payload frequencies for controlling the UAV and also uses the UHF band for flight control at a time at which communication is lost, stable communication is enabled even in an emergency.

Although exemplary embodiments of the present invention have been described for illustrative purposes, those skilled in the art should appreciate that various modifications, additions, and substitutions are possible without departing from the scope and spirit of the present invention.

What claimed is:

1. A communication system for an unmanned aerial vehicle, the communication system comprising:
    an onboard communication apparatus mounted on an unmanned aerial vehicle and configured to operate in a preset first frequency band and a preset second frequency band; and
    a ground communication apparatus configured to communicate with the onboard communication apparatus using the preset first frequency band and the preset second frequency band,
    wherein the ground communication apparatus includes a ground main communicator using the first frequency band and a ground subsidiary communicator using the second frequent band, and the onboard communication apparatus includes an onboard main communicator using the first frequency band and an onboard subsidiary communicator using the second frequency band,
    wherein:
    the ground main communicator includes a baseband unit connected to a ground control apparatus, a transmission unit connected to the baseband unit, a reception unit connected to the baseband unit, a duplexer connected to the transmission unit and the reception unit and an antenna unit connected to the duplexer;
    the ground subsidiary communicator includes a transceiver unit connected to the ground control apparatus, a radio frequency (RF) switch unit connected to the transceiver unit, and an antenna unit connected to the RF switch unit;
    the onboard main communicator includes a baseband unit connected to a flight control computer, a transmission unit connected to the baseband unit, a reception unit connected to the baseband unit, a duplexer connected to the transmission unit and the reception unit, and an antenna unit connected to the duplexer; and
    the onboard subsidiary communicator includes a transceiver unit connected to the flight control computer, a RF switch unit connected to the transceiver unit, and an antenna unit connected to the RF switch.

2. The communication system of claim 1, wherein the preset first frequency band is a C-band and the preset second frequency band is an ultra-high frequency (UHF) band.

3. The communication system of claim 2, wherein the preset first frequency band is a band of 5,030 MHz to 5,091 MHz.

4. The communication system of claim 1, wherein at least one of a telecommands (TCs) and telemetry (TM) is transmitted and received between the onboard communication apparatus and the ground communication apparatus.

5. The communication system of claim 1, wherein the ground communication apparatus communicates with the ground control apparatus through Ethernet, and the onboard communication apparatus communicates with the flight control computer mounted on the unmanned aerial vehicle through RS-232.

6. The communication system of claim 1, wherein at least one of the onboard main communicator and the onboard subsidiary communicator further includes a divider interposed between and connected to the duplexer and the antenna unit, and the antenna unit includes a first antenna unit and a second antenna unit mounted on different positions.

7. A communication method applied in a communication system for an unmanned aerial vehicle, the communication method comprising:
    receiving, by an onboard communication apparatus mounted on an unmanned aerial vehicle, a signal for controlling the unmanned aerial vehicle using a preset first frequency band and a preset second frequency band from a ground communication apparatus; and
    processing, by the onboard communication apparatus, the signal,
    wherein the ground communication apparatus includes a ground main communicator using the first frequency band and a ground subsidiary communicator using the second frequency band, and the onboard communication apparatus includes an onboard main communicator using the first frequency band and an onboard subsidiary communicator using the second frequent, band, wherein:
the ground main communicator includes a baseband unit connected to a ground control apparatus, a transmission unit connected to the baseband unit, a reception unit connected to the baseband unit, a duplexer connected to the transmission unit and the reception unit, and an antenna unit connected to the duplexer;

the ground subsidiary communicator includes a transceiver unit connected to the ground control apparatus, a radio frequency (RF) switch unit connected to the transceiver unit, and an antenna unit connected to the RF switch unit;

the onboard main communicator includes a baseband unit connected to a flight control computer, a transmission unit connected to the baseband unit, a reception unit connected to the baseband unit, a duplexer connected to the transmission unit and the reception unit, and an antenna unit connected to the duplexer; and the onboard subsidiary communicator includes a transceiver unit connected to the flight control computer, a RF switch unit connected to the transceiver unit, and an antenna unit connected to the RF switch.

8. The communication method of claim 7, wherein the preset first frequency band is a C-band.

9. The communication method of claim 8, wherein the preset first frequency band is a band of 5,030 MHz to 5,091 MHz.

10. A communication method applied in a communication system for an unmanned aerial vehicle, the communication method comprising:
generating, by a ground communication apparatus, a signal for controlling an unmanned aerial vehicle; and
transmitting, by the ground communication apparatus, the signal to an onboard communication apparatus mounted on the unmanned aerial vehicle using a preset first frequency band and a preset second frequency band, wherein the ground communication apparatus includes a ground main communicator using the first frequency band and a ground subsidiary communicator using the second frequency band, and the onboard communication apparatus includes an onboard main communicator using the first frequency band and an onboard subsidiary communicator using the second frequency band, wherein:
the ground main communicator includes a baseband unit connected to a ground control apparatus, a transmission unit connected to the baseband unit, a reception unit connected to the baseband unit, a duplexer connected to the transmission unit and the reception unit, and an antenna unit connected to the duplexer;

the ground subsidiary communicator includes a transceiver unit connected to the ground control apparatus a radio frequency (RF) switch unit connected to the transceiver unit, and an antenna unit connected to the RE switch unit;

the onboard main communicator includes a baseband unit connected to a flight control computer, a transmission unit connected to the baseband unit, a reception unit connected to the baseband unit, a duplexer connected to the transmission unit and the reception unit, and an antenna unit connected to the duplexer; and the onboard subsidiary communicator includes a transceiver unit connected to the flight control computer, a RF switch unit connected to the transceiver unit, and an antenna unit connected to the RF switch.

11. The communication method of claim 10, wherein the preset first frequency band is a C-band.

12. The communication method of claim 11, wherein the preset first frequency band is a band of 5,030 MHz to 5,091 MHz.

* * * * *